United States Patent
Aoki et al.

(10) Patent No.: US 7,458,519 B2
(45) Date of Patent: Dec. 2, 2008

(54) CARD TRAY

(75) Inventors: Yoshitaka Aoki, Kanagawa (JP); Keiichi Tsutsui, Kanagawa (JP); Hirotaka Nishizawa, Tokyo (JP); Takashi Totsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/487,812

(22) Filed: Jul. 17, 2006

(65) Prior Publication Data
US 2007/0023530 A1 Feb. 1, 2007

(30) Foreign Application Priority Data
Jul. 26, 2005 (JP) ............... 2005-215965

(51) Int. Cl.
*G06K 19/06* (2006.01)
(52) U.S. Cl. ............... 235/492; 235/451; 235/482; 235/486; 235/495; 361/737; 361/752; 439/630; 439/945
(58) Field of Classification Search .............. 235/492, 235/486, 451, 495, 482; 439/630, 945; 361/737, 361/752
See application file for complete search history.

(56) References Cited

U.S. PATENT DOCUMENTS 5,049,728 A * 9/1991 Rovin ............... 235/492
6,717,805 B2 * 4/2004 Liu et al. ............ 361/684
6,751,694 B2 * 6/2004 Liu et al. ............ 710/301
6,761,313 B2 * 7/2004 Hsieh et al. .......... 235/451
7,052,295 B1 * 5/2006 Lin ................ 439/159
2004/0089717 A1 * 5/2004 Harari et al. .......... 235/441
2004/0229511 A1 * 11/2004 Chen ............... 439/638
2005/0037671 A1 * 2/2005 Yamada et al. .......... 439/677
2005/0225950 A1 * 10/2005 Matsuda et al. ......... 361/737
2005/0258243 A1 * 11/2005 Hsieh ............... 235/441

FOREIGN PATENT DOCUMENTS

JP 2004-265621 9/2004

* cited by examiner

*Primary Examiner*—Uyen-Chau N Le
*Assistant Examiner*—Tuyen K Vo
(74) *Attorney, Agent, or Firm*—Rockey, Depke & Lyons, LLC; Robert J. Depke

(57) ABSTRACT

A card tray to be mounted to a memory card can make the memory card mountable in a card slot for memory cards conforming to standards different from those to which the memory card conforms. The card tray has a main body and a recessed mount section. The recessed mount section is formed such that the holder of a second memory card can be mounted to one of the major surfaces of the main body. A memory-card-mounted body is produced when the second memory card is mounted to the recessed mount section. The card tray is configured such that, when the first memory card is placed on the memory-card-mounted body with the left and right edges thereof aligned with each other, the contact pieces of the first memory card and the contact pieces of the second memory card have longitudinally overlapping parts and transversally overlapping parts as viewed from above.

19 Claims, 16 Drawing Sheets

| Contact piece | Signal name | Signal name | Contact piece |
|---|---|---|---|
| 1 | BS | | |
| 2 | DATA1 | - | 2' |
| 3 | DATA0 | DATA5 | 3' |
| 4 | DATA2 | DATA4 | 4' |
| 5 | INS | DATA6 | 5' |
| 6 | DATA3 | DATA7 | 6' |
| 7 | SCLK | - | 7' |
| 8 | Vcc | - | 8' |
| 9 | Vss | - | 9' |
| 10 | D1 | - | 10' |
| 11 | D2 | | |

FIG.3A

| Contact piece | Signal name | Signal name | Contact piece |
|---|---|---|---|
| 1 | BS | | |
| 2 | DATA1 | - | 2' |
| 3 | DATA0 | DATA5 | 3' |
| 4 | DATA2 | DATA4 | 4' |
| 5 | INS | - | 5' |
| 6 | DATA3 | - | 6' |
| 7 | SCLK | - | 7' |
| 8 | Vcc | - | 8' |
| 9 | Vss | DATA6 | 9' |
| 10 | D1 | DATA7 | 10' |
| 11 | D2 | | |

FIG.3B

| Contact piece | Signal name |
|---|---|
| 42 | DAT2 |
| 43 | DAT3 |
| 44 | CMD |
| 45 | VDO |
| 46 | CLK |
| 47 | Vss |
| 48 | DAT0 |
| 49 | DAT1 |

FIG.6

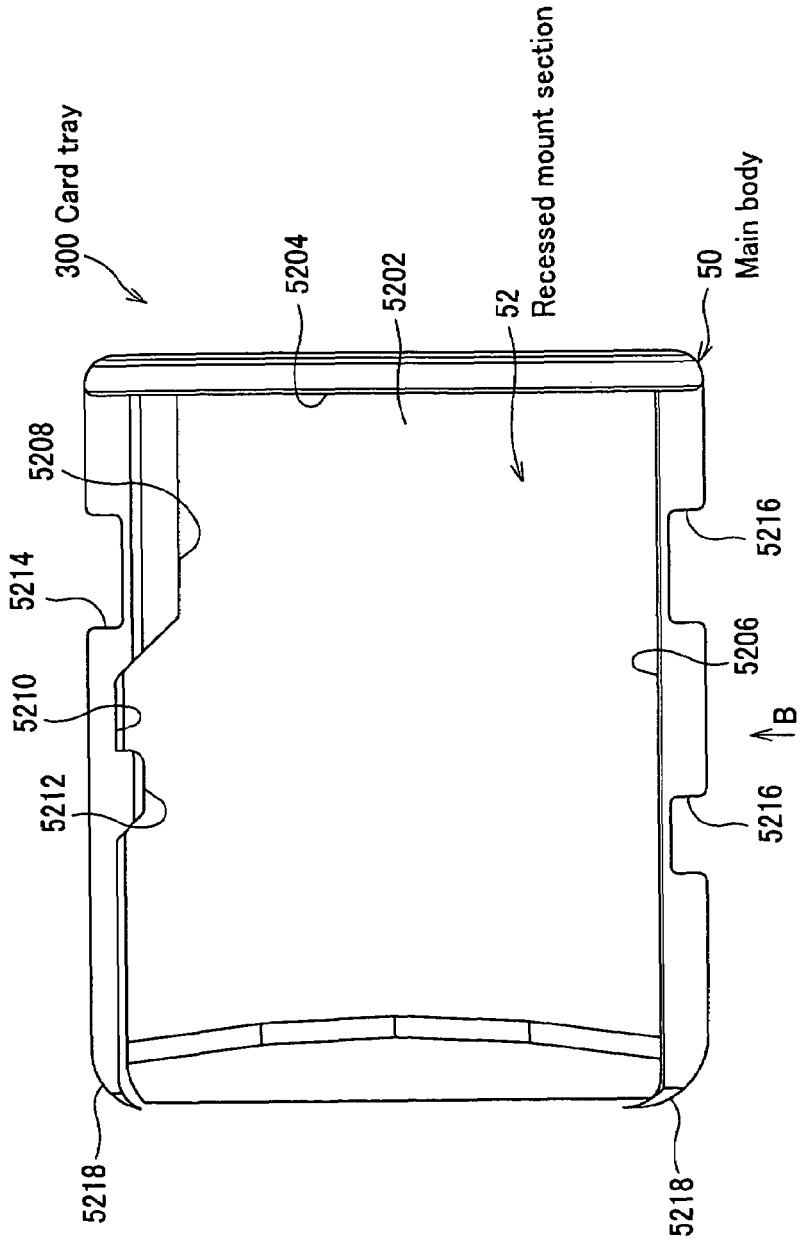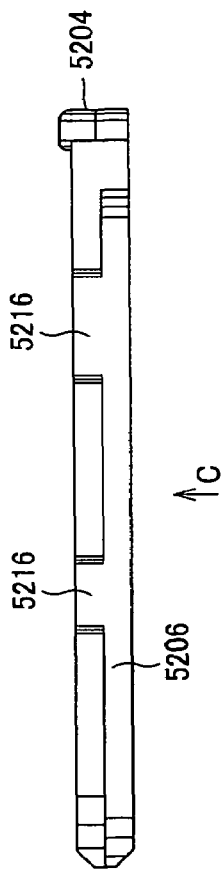
FIG.7A
FIG.7B

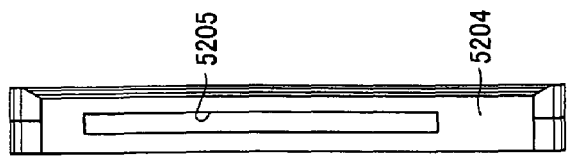
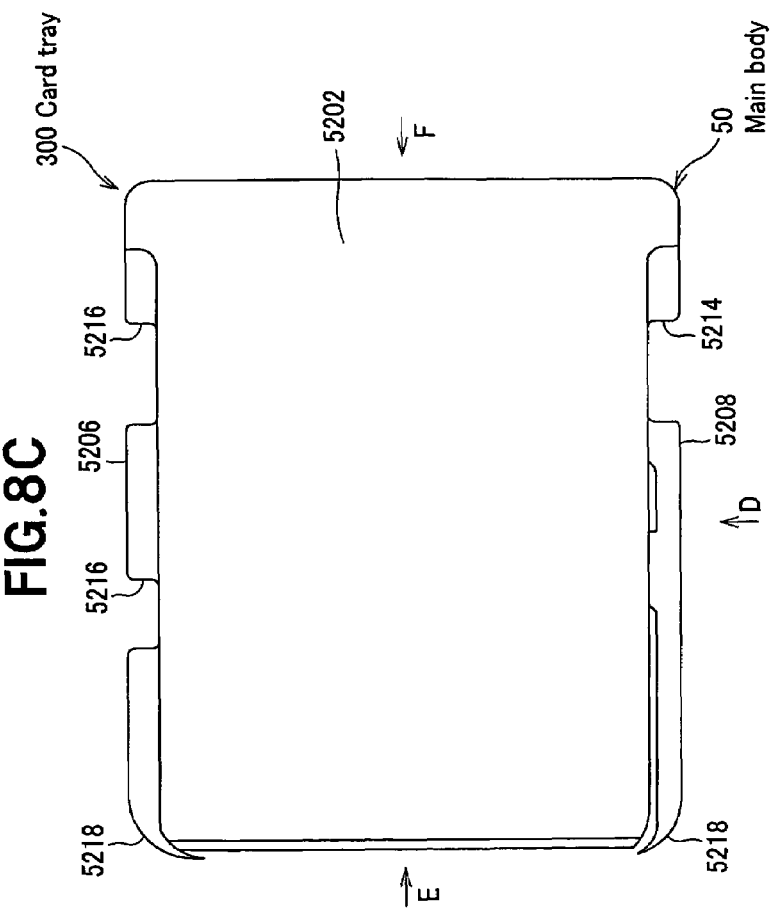
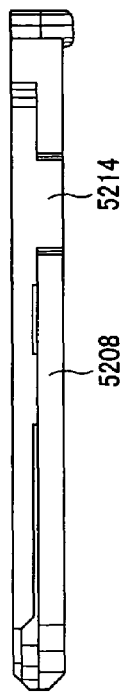
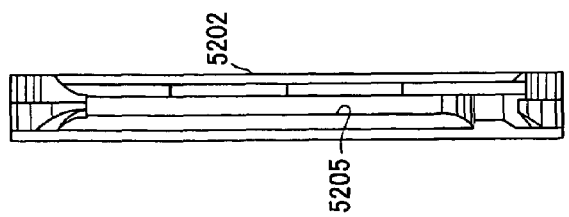

| Contact piece | Signal name | Signal name | Contact piece | Contact piece |
|---|---|---|---|---|
| 1 | BS | | | |
| 2 | DATA1 | | 2' | |
| 3 | DATA0 | DATA2 | 3' | 42 |
| 4 | DATA2 | DATA3 | 4' | 43 |
| 5 | INS | CMD | 5' | 44 |
| 6 | DATA3 | $V_{DD}$ | 6' | 45 |
| 7 | SCLK | CLK | 7' | 46 |
| 8 | Vcc | Vss | 8' | 47 |
| 9 | Vss | DATA0 | 9' | 48 |
| 10 | D1 | DATA1 | 10' | 49 |
| 11 | D2 | | | |

FIG.14

CARD TRAY

CROSS REFERENCES TO RELATED APPLICATIONS

The present invention contains subject matter related to Japanese Patent Application JP 2005-215965 filed in the Japanese Patent Office on Jul. 26, 2005, the entire contents of which being incorporated herein by reference.

BACKGROUND OF THE INVENTION

1. Field of the Invention

The present invention relates to a card tray to which a memory card is mounted.

2. Description of the Related Art

Memory cards including a writable flash memory are being marketed so as to be used for writing data in and reading data from the flash memory.

Such a memory card is typically mounted in the card slot (connector) of an external apparatus such as personal computer or portable telephone set so as to be used for writing data in and reading data from the flash memory of the memory card.

Known memory cards include Memory Sticks (Registered Trademark, available from Sony Corporation), Multi Media Cards (MMC: Registered Trademark, available from Infineon Technologies AG) and SD Cards (Registered Trademark, available from Matsushita Electric Industrial Co., Ltd., Toshiba Corporation and SanDisk, Inc.).

The above listed known memory cards are manufactured according to different sets of product specifications that differ from each other in terms of external dimensions, outer profiles, interfaces to be used for data communications with external apparatus including standards defining the type and the number of signals for data communications and the sequence of data communications.

Therefore, any single card slot for receiving a memory card is not able to receive memory cards of different types.

For this reason, if there are first and second memory cards manufactured according to different sets of specifications, in case of mounting the second memory card in the card slot for the first memory card, a memory card adaptor for converting the set of specifications for the second card to the set of specifications for the first card is used (see Patent Document 1: Jpn. Pat. Appln. Laid-Open Publication No. 2004-265621).

That is, by mounting the second memory card to the memory card adaptor, the second memory card can be mounted in the card slot for the first memory card through the memory card adaptor.

SUMMARY OF THE INVENTION

Now, such a memory card adaptor has to include first adaptor side contact pieces to be electrically connected to the signal input/output contact pieces of the second memory card, second adaptor side contact pieces to be electrically connected to the terminals of the card slot and conductors for electrically connecting the first adaptor side contact pieces and the second adaptor side contact pieces in order to electrically connect the signal input/output contact pieces of the second memory card and the terminals of the card slot.

Thus, space for arranging these contact pieces and the conductors is necessary to the memory card adaptor.

However, downsized memory cards of a plurality of different types having external dimensions smaller than those of existing memory cards have been proposed in recent years.

Such downsized memory cards include TransFlash Cards (Registered Trademark, available from SanDisk, Inc.) whose electric specifications are substantially same as those of SD cards.

As a matter of course, memory card adaptors to be used for such downsized memory cards have reduced external dimensions.

Then, it is difficult for memory card adaptors for receiving such downsized memory cards to secure space for arranging contact pieces and conductors to a great disadvantage for manufacturing such memory card adaptors.

In view of the above-identified circumstances, it is desirable to provide a card tray to be mounted to a memory card that can make the memory card mountable in a card slot for memory cards conforming to standards different from those to which the memory card conforms even the memory card is a downsized one.

According to an embodiment of the present invention, there is provided a card tray to be mounted to a second memory card that is mounted to a first memory card, the first memory card having a memory section buried in a rectangular plate-shaped holder having a length and a width dimensionally larger than the thickness thereof and a plurality of contact pieces arranged transversally in array on the surface of the holder, the second memory card having a memory section buried in a rectangular plate-shaped holder smaller than the holder of the first memory card and a plurality of contact pieces arranged transversally in array on the surface of the holder at the same pitch as that of the contact pieces of the first memory card, the card tray including: a thin plate-shaped main body; and an open and recessed mount section formed on one of the major surfaces of the main body to which the holder of the second memory card is mounted; a memory-card-mounted body being formed by mounting the second memory card to the recessed mount section with the surface directed opposite to the recessed mount section, the thickness and the width of the memory-card-mounted body being same and identical with the thickness and the width of the first memory card.

Thus, according to the embodiment of the present invention, as the memory-card-mounted body is inserted into a card slot for receiving a first memory card, the terminals of the card slot are electrically directly connected to the corresponding respective contact pieces of the second memory card.

Therefore, unlike card adaptors used in the past, the card tray does not have to have any adaptor side contact pieces and conductor members and hence it is possible to make the external dimensions of the card tray agree with those of the downsized first memory card so that the second memory card can be mounted in the card slot for receiving the first memory card by mounting it to a card tray and forming a memory-card-mounted body.

BRIEF DESCRIPTION OF THE DRAWINGS

FIGS. 3A and 3B are charts illustrating the correspondence between the contact pieces of the first memory card 100 and signal names;

FIG. 6 is a chart illustrating the correspondence between the contact pieces of the second memory card 200 and signal names;

FIG. 7A is a schematic plan view of a card tray 300, and FIG. 7B is a schematic view of the card tray 300 as viewed in the direction of arrow B in FIG. 7A;

FIG. 8C is a schematic view of the card tray 300 as viewed in the direction of arrow C in FIG. 7B, FIG. 8D is a schematic view of the card tray 300 as viewed in the direction of arrow D in FIG. 8C, while FIG. 8E is a schematic view of the card tray 300 as viewed in the direction of arrow E in FIG. 8C and FIG. 8F is a schematic view of the card tray 300 as viewed in the direction of arrow F in FIG. 8C;

FIG. 14 is a chart illustrating the corresponding relationship between contact pieces 2' through 10' of the first memory card 100 of FIG. 13 and contact pieces 42 through 49 of the second memory card 200;

DETAILED DESCRIPTION OF THE PREFERRED EMBODIMENTS

First Embodiment

Now, the first embodiment of the present invention will be described in detail by referring to the accompanying drawings.

Figure 1:
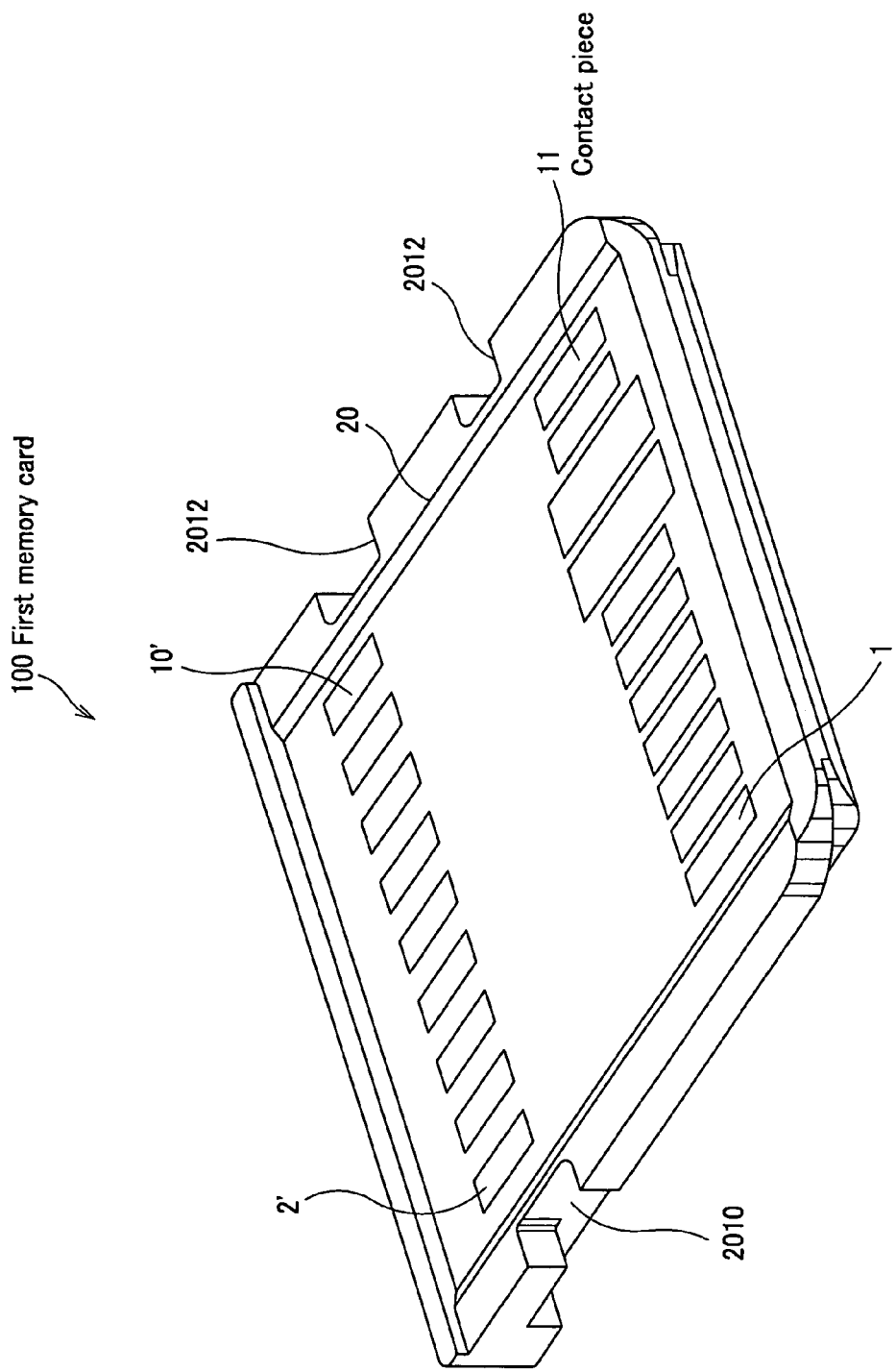
FIG. 1 is a schematic perspective view of a first memory card 100.

FIG. 1 is a schematic perspective view of a first memory card 100.

Figure 2B:
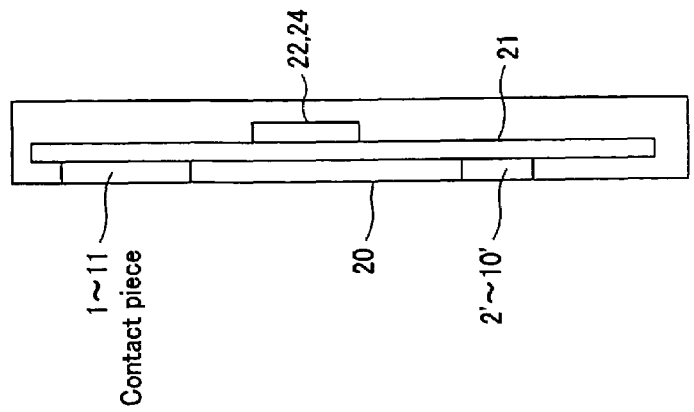
FIG. 2B is a schematic cross sectional view of the first memory card 100.
Figure 2A:
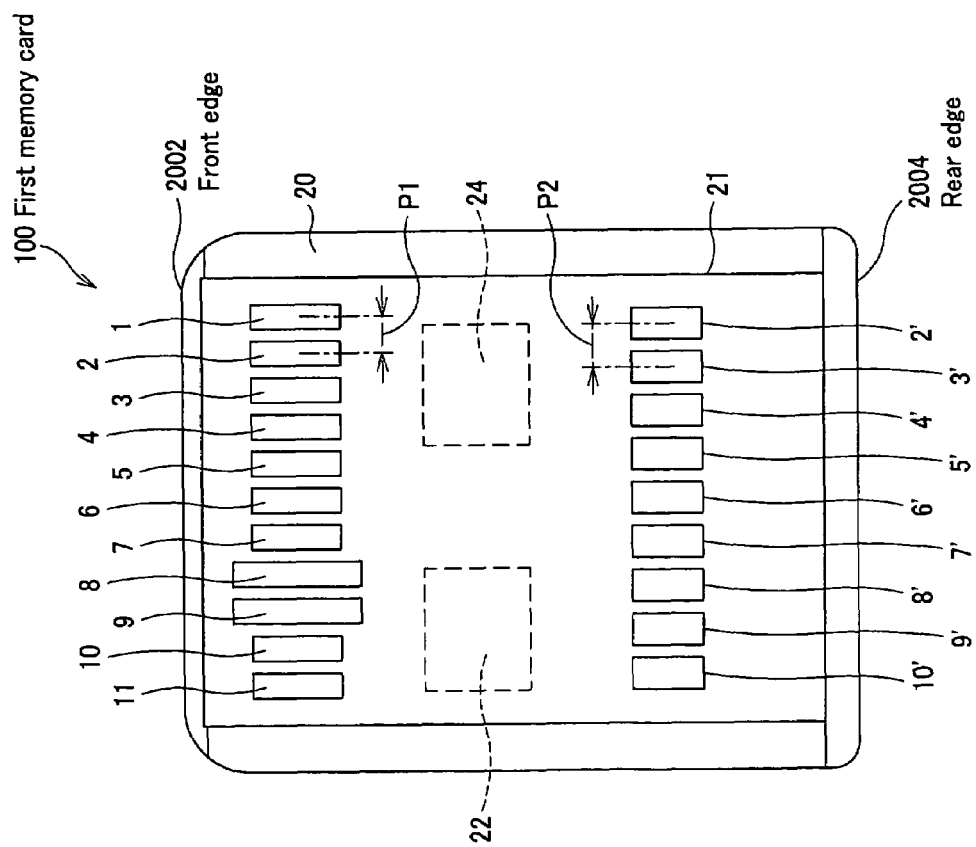
FIG. 2A is a schematic plan view of the first memory card 100.

FIG. 2A is a schematic plan view of the first memory card 100, and FIG. 2B is a schematic cross sectional view of the first memory card 100.

FIG. 3A is a chart illustrating the correspondence between the contact pieces of the first memory card 100 and signal names.

In the following description, the side of each of the first memory card 100 and second memory card 200 by which the card is inserted into a card slot is referred to as front edge whereas the side of each of first memory card 100 and second memory card 200 by which the card is taken out from the card slot is referred to as rear edge.

The side of each of the first memory card 100 and second memory card 200 and card tray 300 that is found at the right side as viewed from the rear edge is referred to as right edge, whereas the side of each of those that is found at the left side as viewed from the rear edge is referred to as left edge.

Firstly, two memory cards, or first memory card 100 (see FIG. 1) and second memory card 200 (see FIG. 4), that are prepared according to respective sets of specifications will be described.

For the purpose of this embodiment, the first memory card 100 is a memory card prepared according to specifications substantially same as those of Memory Sticks (Registered Trademark, available from Sony Corporation) in terms of interface but having downsized external dimensions if compared with a Memory Stick.

For the purpose of this embodiment, the second memory card 200 is a TransFlash (Registered Trademark, available from SanDisk, Inc.) prepared according to specifications substantially same as those of SD Cards (Registered Trademark, available from Matsushita Electric Industrial Co., Ltd., Toshiba Corporation and SanDisk, Inc.) in terms of interface but having downsized external dimensions if compared with a TransFlash.

The second memory card 200 has a thickness and a width smaller than those of the first memory card 100 but a length same as that of the first memory card 100.

As shown in FIGS. 2A and 2B, the first memory card 100 includes a holder 20, a memory section 22 buried in the holder 20, a controller 24 also buried in the holder 20, a plurality of contact pieces 1 through 11 and 2' through 10' that are connected to the controller 24.

The holder 20 has a thin plate-shaped profile and includes a printed circuit board 21 that is covered by synthetic resin.

As pointed out above, the holder 20 has a thin and rectangular plate-shaped profile with a width smaller than the length thereof and a thickness smaller than the width thereof. In this embodiment, the length, the width and the thickness of the holder 20 are respectively 15 mm, 12 mm and 1.2 mm.

The printed circuit board 21 is covered by insulating synthetic resin at the two oppositely disposed major surfaces thereof. The synthetic resin may typically be PC (polycarbonate) or liquid crystal polymer.

While the memory section 22 and the controller 24 are illustrated separately in FIGS. 2A and 2B for the purpose of easy understanding, they may be arranged to show any of known sophisticated structures such as a multilayer structure.

The memory section 22, the controller 24 and the plurality of contact pieces 1 through 11 and 2' through 10' are arranged on the printed circuit board 21.

The memory section 22 is formed by using a flash memory where data are rewritable.

The controller 24 controls data communications with external apparatus and data input/output operations relative to the memory section 22.

The controller 24 performs data communications with an external apparatus by way of a predetermined interface for the first memory card 100 when the first memory card 100 is mounted to the external apparatus. A predetermined interface as used herein refers to one that conforms to a given standard for data communications in terms of types and numbers of signals to be used for data communications and sequence of data communications.

The memory section 22, the controller 24 and the contact pieces 1 through 11 and 2' through 10' are arranged on the surface of the holder 20 opposite to the side where the printed circuit board 21 is arranged.

As shown in FIG. 2A, the contact pieces 1 through 11 and 2' through 10' are arranged in array on the surface along the transversal edges of the holder 20 at the longitudinal opposite ends of the holder 20. More specifically, the contact pieces 1 through 11 are aligned along the front edge 2002 of the surface, whereas the contact pieces 2' through 10' are aligned along the rear edge 2004 of the surface.

The contact pieces 1 through 11 are arranged at a same pitch P1.

The contact pieces 2' through 10' are arranged at a same pitch P2, which is larger than the pitch P1.

While the contact pieces 1 through 11 and 2' through 10' are connected to the controller 24 by way of an electro-conductive pattern formed on the printed circuit board 21, the electro-conductive pattern is omitted from FIGS. 2A and 2B for the purpose of simplicity.

The plurality of contact pieces 1 through 11 and 2' through 10' include signal terminals for exchanging signals with the controller 24, a ground terminal for supplying the ground potential to the controller 24 and the memory section 22 and a power supply terminal for supplying power to the controller 24 and the memory section 22.

More specifically, as shown in FIG. 3A, the contact piece 1 is a signal terminal where bus state signal BS for indicating a gap separating the data to be transmitted/received by way of data signals DATA0 through DATA3 is input.

The contact piece 2 is a signal terminal for inputting/outputting data signal DATA1 and the contact piece 3 is a signal terminal for inputting/outputting data signal DATA0, whereas the contact piece 4 is a signal terminal for inputting/outputting data signal DATA2 and the contact piece 6 is a signal terminal for inputting/outputting data signal DATA3.

The contact piece 3' is a signal terminal for inputting/outputting data signal DATA5 and the contact piece 4' is a signal terminal for inputting/outputting data signal DATA4, whereas the contact piece 5' is a signal terminal for inputting/outputting data signal DATA6 and the contact piece 6' is a signal terminal for inputting/outputting data signal DATA7.

Note that the contact pieces 2', 7' and 10' are not used in this embodiment.

The contact piece 5 is an insertion/withdrawal detection contact piece. It is a signal terminal for supplying an INS signal to be used by the external apparatus in order to detect insertion/withdrawal of a memory card. In this embodiment, an INS signal showing the GND level indicates that a memory card is mounted.

The contact piece 7 is a signal terminal for receiving clock signal SCLK as input. Above-described bus state signal BS and data signals DATA0 through DATA7 are used for communications in synchronism with clock signal SCLK.

The contact piece 8 is a power supply terminal where source voltage Vcc is input.

The contact piece 9 is a ground terminal connected to the ground level VSS.

The contact pieces 10, 11 are terminals for receiving interface switching signals supplied from an external apparatus. More specifically, when the controller 24 has a feature of being able to perform data communications by way of a plurality of different interfaces, it can select the interface to be used for data communication by receiving interface switching signals D1, D2 from the external apparatus. Interface switching may be bit width switching (e.g., from 4 bits width to 8 bits width or vice versa) to be used for data communications. However, interface switching will not be described any further because it is not directly related to the gist of the present invention.

Note, however, that the combinations of the contact pieces of the first memory card 100 and signals are not limited to those listed in FIG. 3A. For example, DATA6, DATA7 may be assigned respectively to the contact pieces 9', 10' instead of being assigned to the contact pieces 5', 6' as shown in FIG. 3B.

Now, the second memory card 200 will be described below.

Figure 4:
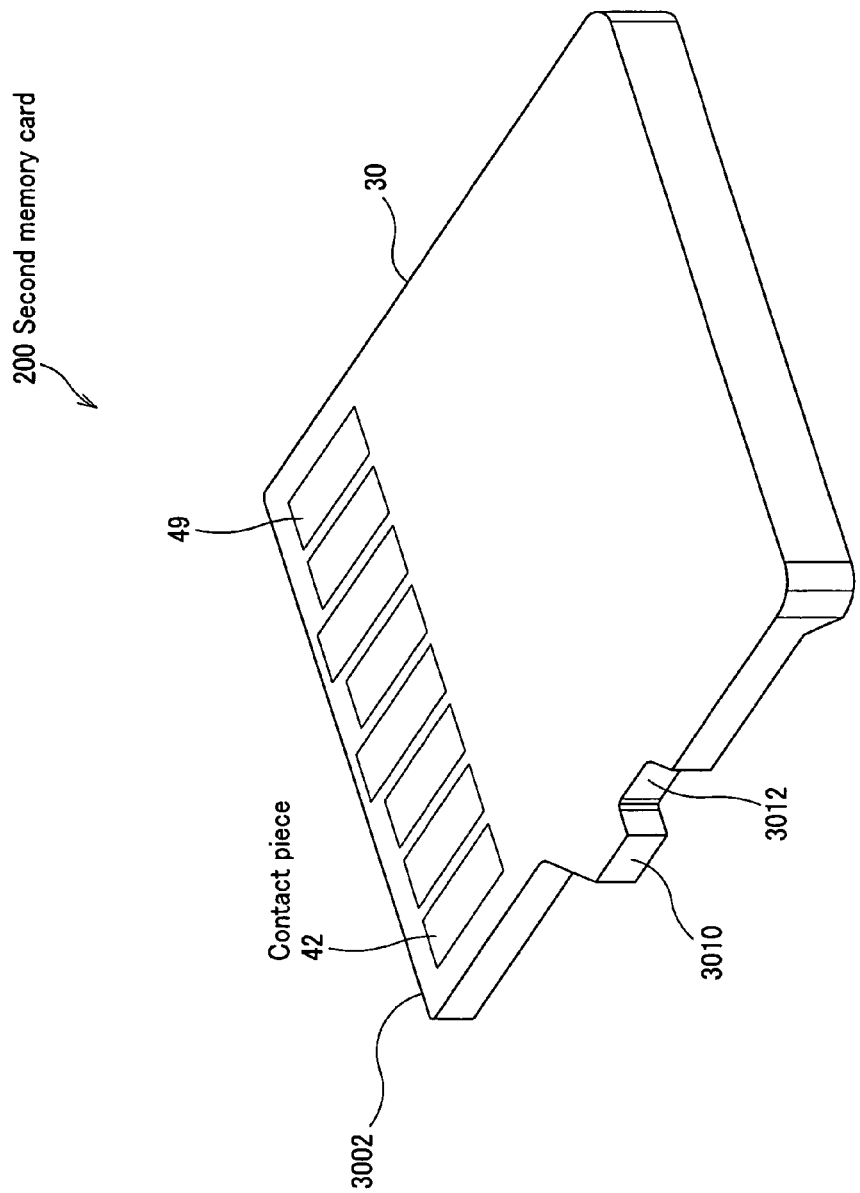
FIG. 4 is a schematic perspective view of a second memory card 200.

FIG. 4 is a schematic perspective view of the second memory card 200.

Figure 5:
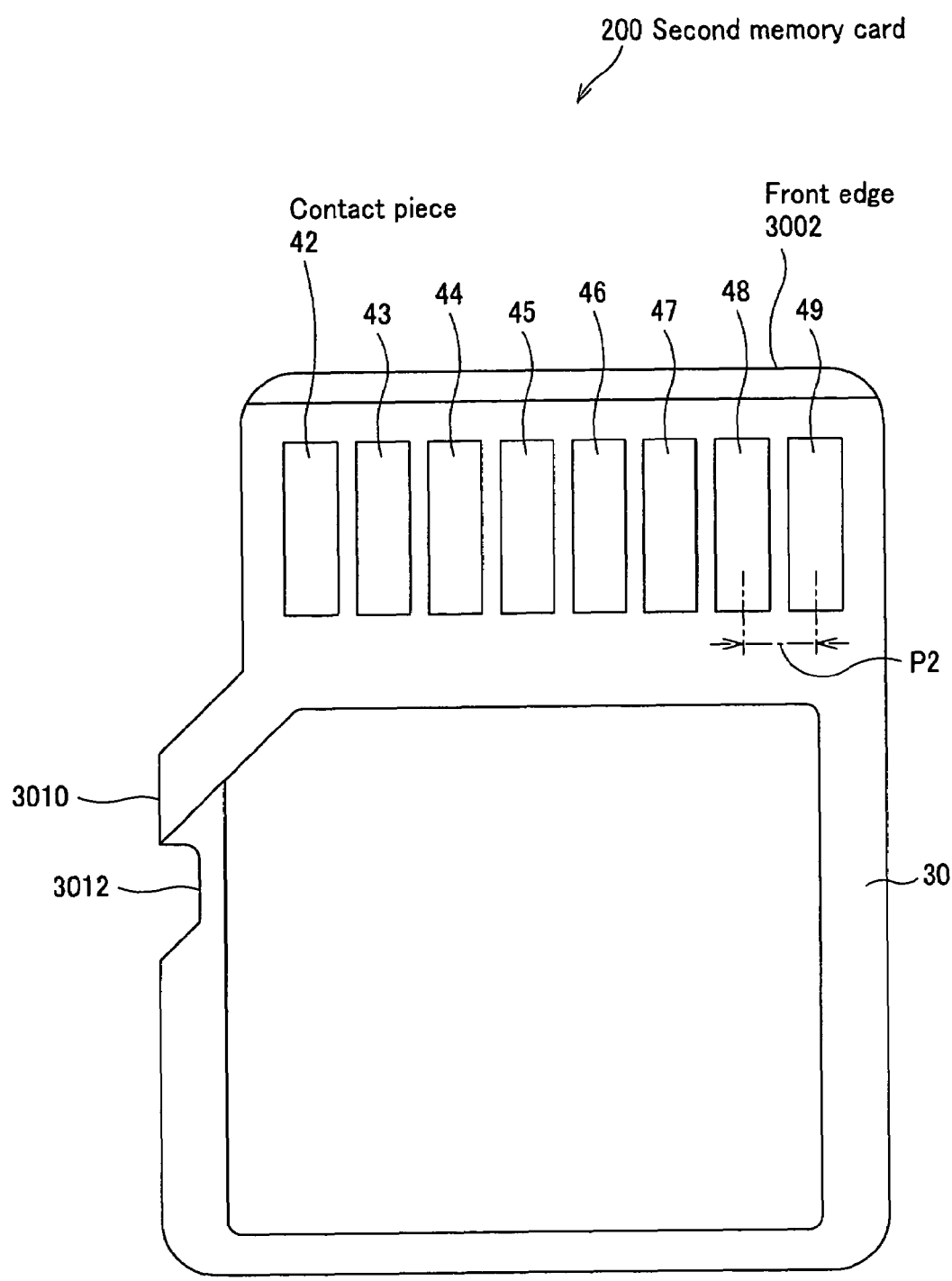
FIG. 5 is a schematic plan view of the second memory card 200.

FIG. 5 is a schematic plan view of the second memory card 200.

FIG. 6 is a chart illustrating the correspondence between the contact pieces of second memory card 200 and signal names.

As shown in FIGS. 4 and 5, the second memory card 200 includes a holder 30, a memory section (not shown) buried in the holder 30, a controller (not shown) also buried in the holder 30, a plurality of contact pieces 42 through 49 that are connected to the controller.

Like the first memory card 100, the holder 30 has a thin plate-shaped profile and includes a printed circuit board that is covered by synthetic resin.

As pointed out above, the holder 30 has a thin and rectangular plate-shaped profile with a width smaller than the length thereof and a thickness smaller than the width thereof.

In this embodiment, the length, the width and the thickness of the holder 30 are respectively 15 mm, 11 mm and 1.0 mm. Thus, the holder 30 of the second memory card 200 has a length same as the holder 20 of the first memory card 100 but the thickness and the width of the holder 30 are smaller than those of the holder 20.

The memory section, the controller and the plurality of contact pieces 42 through 49 are arranged on the printed circuit board.

The memory section is formed by using a flash memory where data are rewritable.

The controller controls data communications with external apparatus and data input/output operations relative to the memory section.

The controller performs data communications with an external apparatus by way of an interface for the second memory card 200 when the second memory card 200 is mounted to the external apparatus.

As shown in FIG. 5, the contact pieces 42 through 49 are arranged in array on the surface along the transversal edges of the holder 30 at the longitudinal opposite ends of the holder 30. More specifically, the contact pieces 42 through 49 are aligned along the front edge 3002 of the surface.

The contact pieces 42 through 49 are arranged at pitch P2, which is same as the pitch of arrangement of the contact pieces 2' through 10' of the first memory card 100.

The plurality of contact pieces 42 through 49 include signal terminals for exchanging signals with the controller, a ground terminal for supplying the ground potential to the controller and the memory section and a power supply terminal for supplying power to the controller and the memory section.

More specifically, as shown in FIG. 6, the contact piece 42 is a signal terminal for inputting/outputting data signal DAT2 and the contact piece 43 is a signal terminal for inputting/outputting data signal DAT3, while the contact piece 48 is a signal terminal for inputting/outputting data signal DAT0 and the contact piece 49 is a signal terminal for inputting/outputting data signal DAT1.

The contact piece 44 is an input terminal for receiving command (CMD).

The contact piece 45 is a power supply terminal where power source VDD is input.

The contact piece 46 is a signal terminal for receiving clock signal CLK as input. Data signals DAT0 through DAT3 are used for communications in synchronism with clock signal CLK.

The contact piece 47 is a ground terminal connected to the ground level VSS.

Now, the card tray 300 will be described below.

FIG. 7A is a schematic plan view of the card tray 300, and FIG. 7B is a schematic view of the card tray 300 as viewed in the direction of arrow B in FIG. 7A.

FIG. 8C is a schematic view of the card tray 300 as viewed in the direction of arrow C in FIG. 7B, FIG. 8D is a schematic view of the card tray 300 as viewed in the direction of arrow D in FIG. 8C, while FIG. 8E is a schematic view of the card tray 300 as viewed in the direction of arrow E in FIG. 8C and FIG. 8F is a schematic view of the card tray 300 as viewed in the direction of arrow F in FIG. 8C.

Figure 9A:
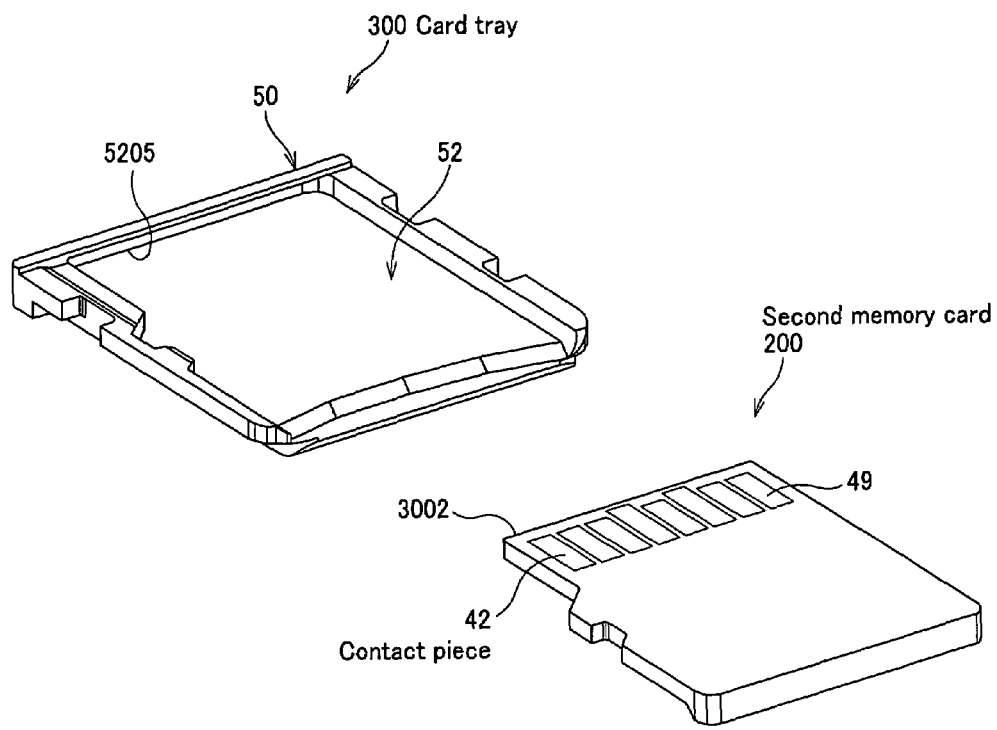
FIG. 9A is a schematic perspective view of the card tray 300 and that of the second memory card 200 to be mounted to the card tray 300.
Figure 9B:
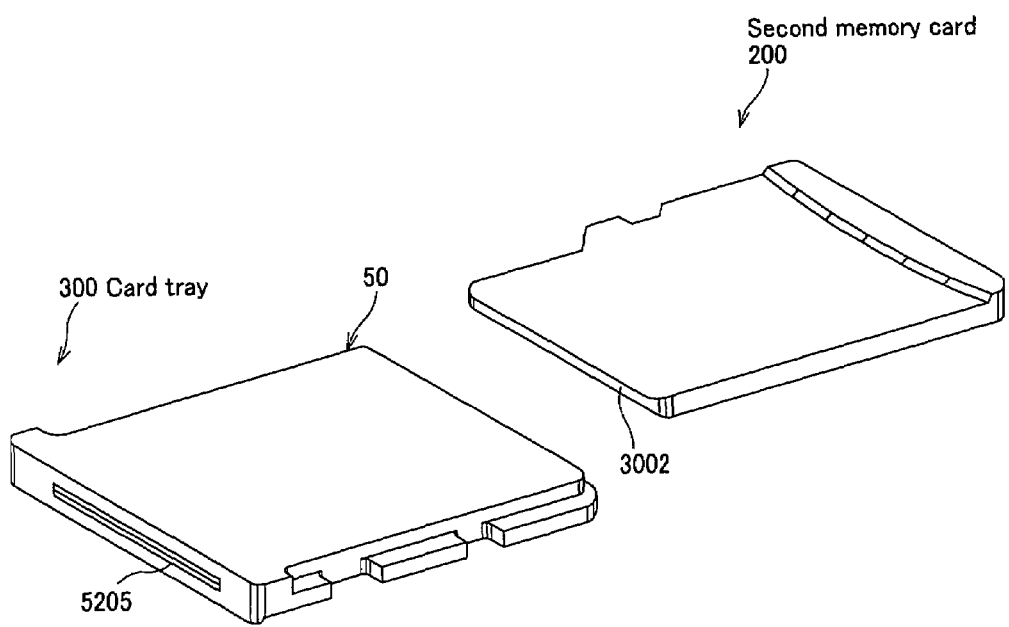
FIG. 9B is a schematic perspective view of the card tray 300 and that of the second memory card 200 to be mounted to the card tray 300, FIG. 9B being inverted views of FIG. 9A.

FIG. 9A is a schematic perspective view of the card tray 300 and that of second memory card 200 to be mounted to the card tray 300, and FIG. 9B is a schematic perspective view of the card tray 300 and that of second memory card 200 to be mounted to the card tray 300, FIG. 9B being inverted views of FIG. 9A.

Figure 10A:
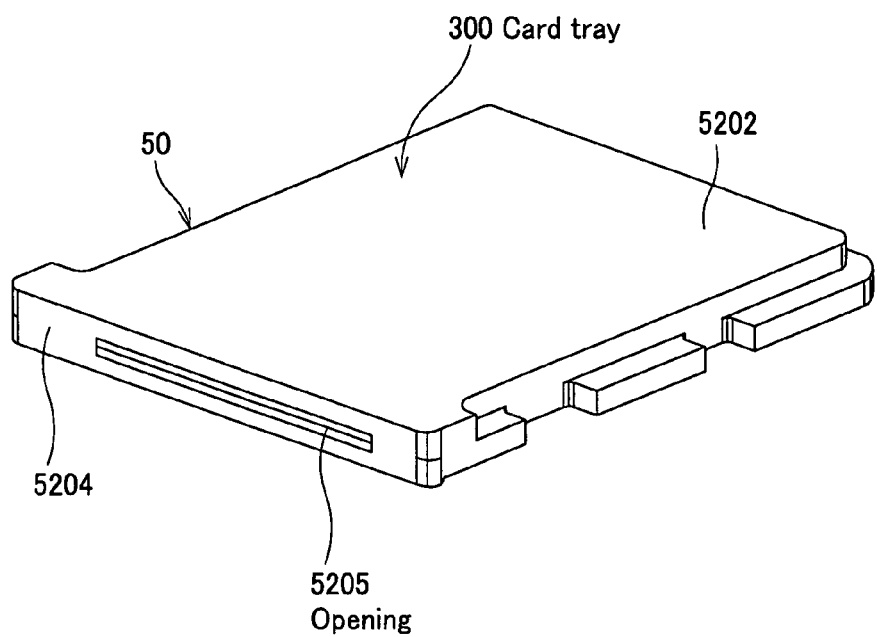
FIG. 10A is a schematic perspective view of the card tray 300, showing the card tray 300 alone.
Figure 10B:
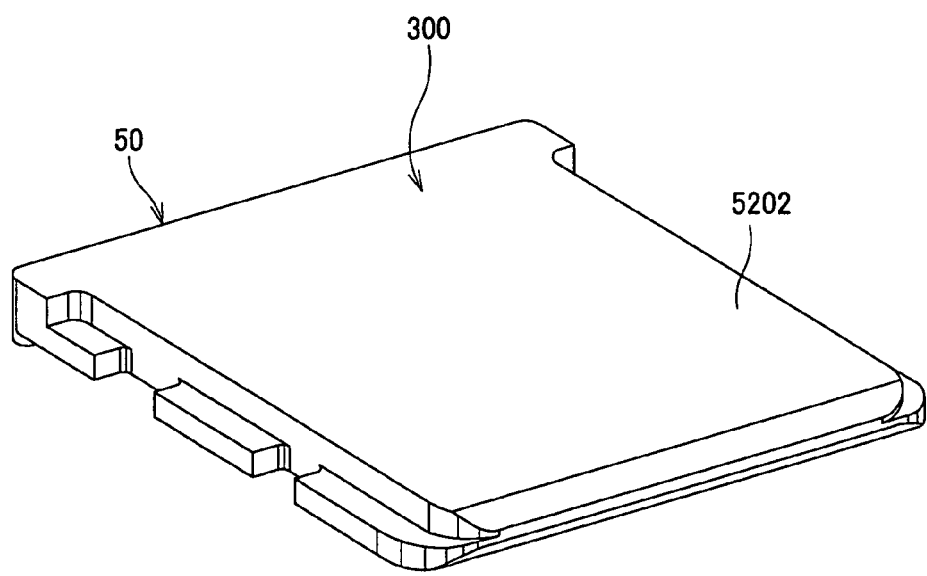
FIG. 10B is an inverted schematic perspective view of the card tray 300, also showing the card tray 300 alone.

FIG. 10A is a schematic perspective view of the card tray 300, showing the card tray 300 alone, and FIG. 10B is an inverted schematic perspective view of the card tray 300, also showing the card tray 300 alone.

As shown in FIGS. 7A through 10B, the card tray 300 includes a main body 50 and a recessed mount section 52.

The main body 50 has a rectangular plate-shaped profile and includes front edge and a rear edge that are arranged oppositely relative to each other as well as a left edge and a right edge that are arranged oppositely relative to each other. It has a width same as the holder 20 of the first memory card 100.

The recessed mount section 52 is formed on one of the major surfaces of the main body 50 so as to receive the holder 30 of the second memory card 200.

Figure 11A:
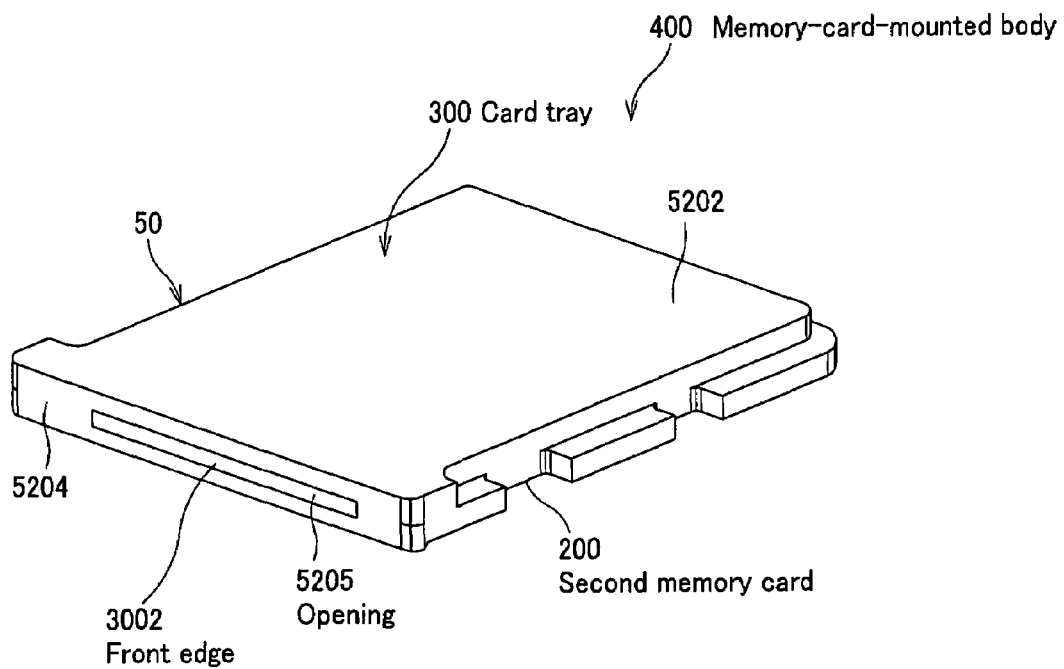
FIG. 11A is a schematic view of a memory-card-mounted body 400.
Figure 11B:
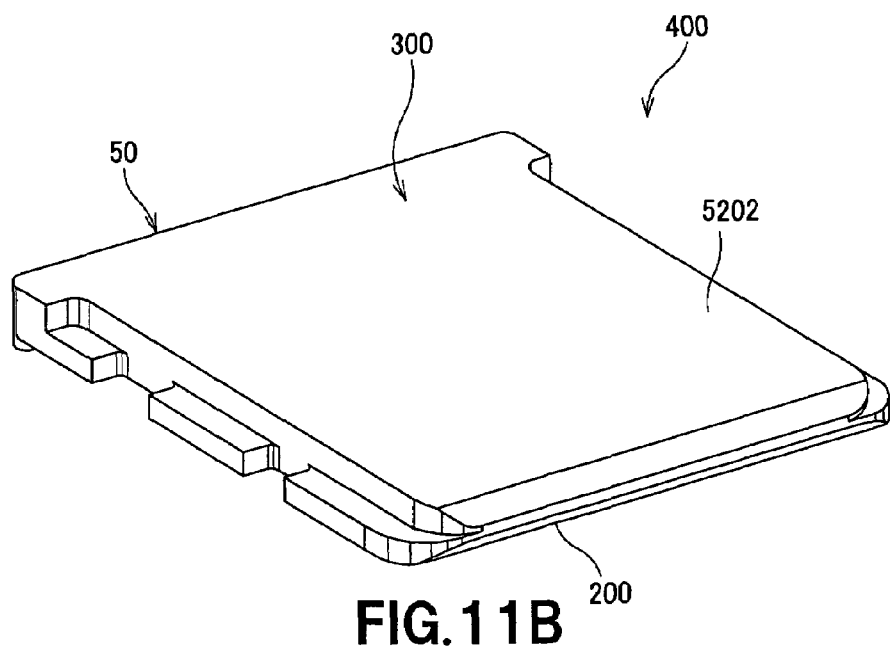
FIG. 11B is an inverted schematic perspective view of the memory-card-mounted body 400.

FIG. 11A is a schematic view of the memory-card-mounted body 400, and FIG. 11B is an inverted schematic perspective view of the memory-card-mounted body 400.

Figure 12A:
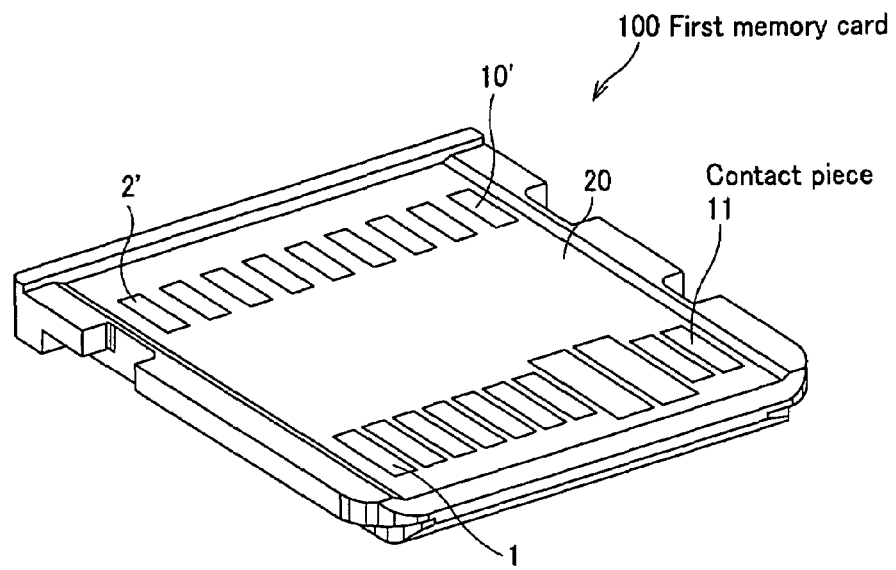
FIG. 12A is a schematic perspective view of the first memory card 100.
Figure 12B:
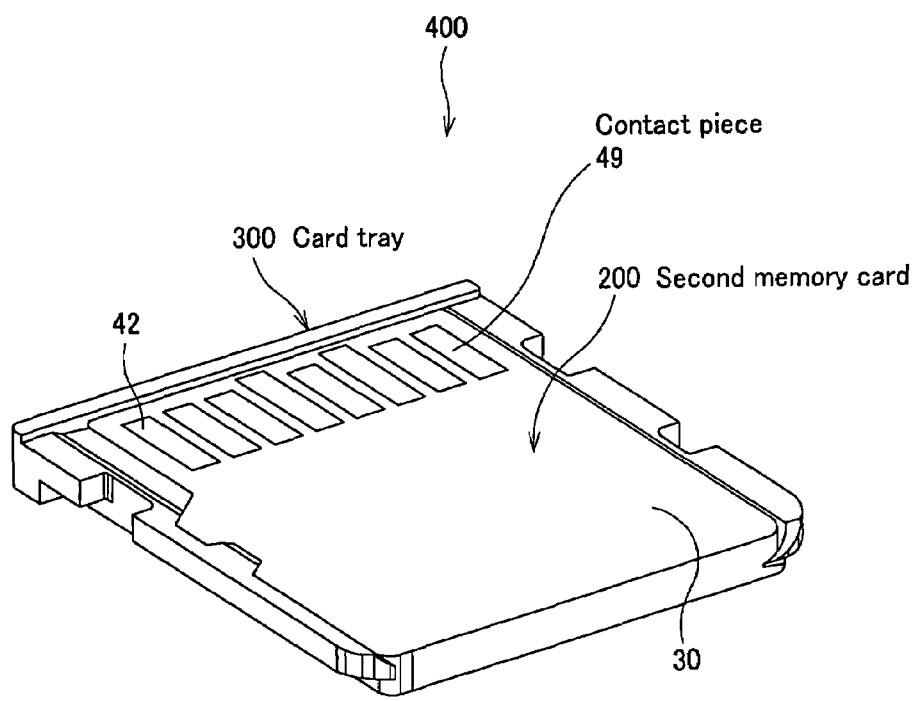
FIG. 12B is a schematic perspective view of the memory-card-mounted body 400.

FIG. 12A is a schematic perspective view of the first memory card 100, and FIG. 12B is a schematic perspective view of the memory-card-mounted body 400.

As shown in FIGS. 11A, 11B and 12B, the memory-card-mounted body 400 is formed as the second memory card 200 is mounted to the recessed mount section 52.

As shown in FIGS. 7A through 8F, the recessed mount section 52 is defined by a rear wall 5204, a left wall 5206 and a right wall 5208 that extend respectively along the rear edge, the left edge and the right edge of the main body 50 and also by the bottom wall 5202 that is surrounded by the rear wall 5204, the left wall 5206 and the right wall 5208. Thus, it is open at the side of one of the major surfaces of the main body and also along the front edge.

The rear wall 5204 has an opening 5205 located on the bottom wall 5202 and extends transversely for receiving the second memory card 200 to be inserted therein from the front edge 3002 of the second memory card 200.

As shown in FIGS. 7A through 8F, the inner surface of the right wall 5208 that faces the recessed mount section 52 is provided with an engaging recess 5210 to be engaged with engaging projection 3010 of the second memory card 200 and an engaging projection 5212 to be engaged with engaging recess 3012 of the second memory card 200 as shown in FIG. 5. In this embodiment, the engaging section of the claims is formed by the engaging projection 3010 and the engaging recess 3012, and the engaging section of the claims is formed by the engaging recess 5210 and the engaging projection 5212.

The inner surface of the left wall 5206 that faces the recessed mount section 52 is a flat surface.

As shown in FIGS. 7A through 9B, the thickness of the main body 50 and the depth of the recessed mount section 52 have such dimensions that the height from the other major surface of the main body 50 to the surface of the second memory card 200 is same as the thickness of the first memory card 100 when the second memory card 200 is mounted to the recessed mount section 52 with the surface of the second memory card 200 facing away from the recessed mount section 52. Differently stated, the memory-card-mounted body 400 and the first memory card 100 have the same thickness.

The length of the main body 50 is same as that of the second memory card 200.

The width of the main body 50 is larger than the width of the second memory card 200.

The length of the recessed mount section 52 is smaller than the length of the second memory card 200 as the second memory card 200 is inserted into the opening 5210 from the front edge 3002 of the second memory card 200.

The width of the recessed mount section 52 is substantially same as that of the second memory card 200.

Thus, as the second memory card 200 is mounted to the recessed mount section 52, the second memory card 200 is contained within the profile of the card tray 300 as viewed from above.

Figure 13:
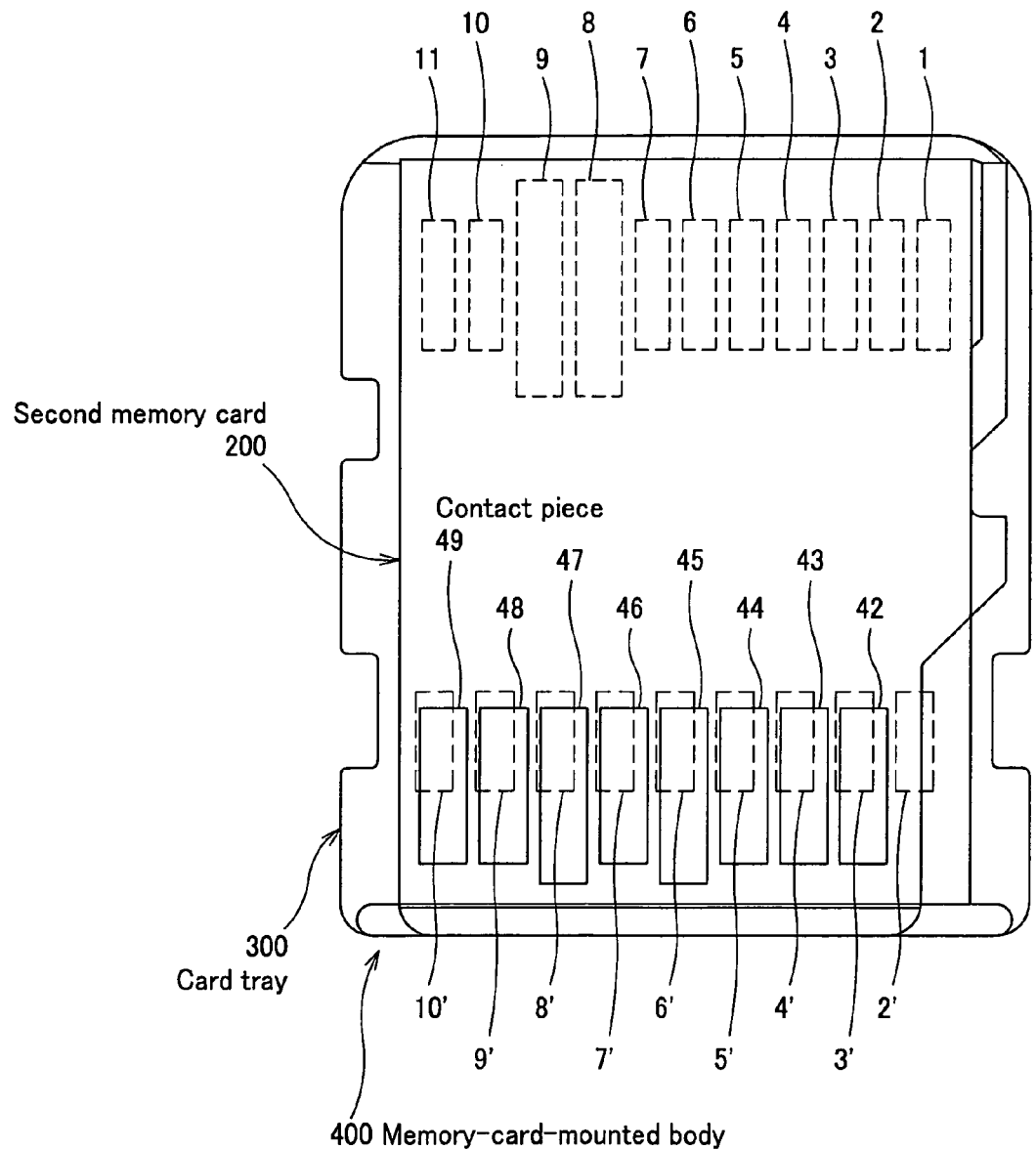
FIG. 13 is a schematic view of the memory-card-mounted body 400 illustrating the profiles of contact pieces 1 through 11 and 2' through 10' of the first memory card 100 aligned with the memory-card-mounted body 400.
Figure 15A:
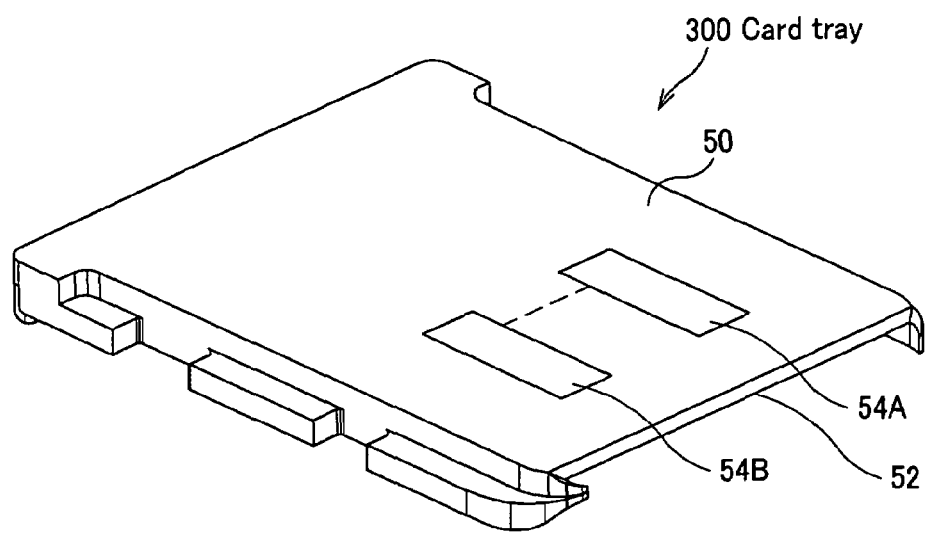
FIG. 15A and FIG. 15B are schematic perspective views of modified card tray 300.
Figure 15B:
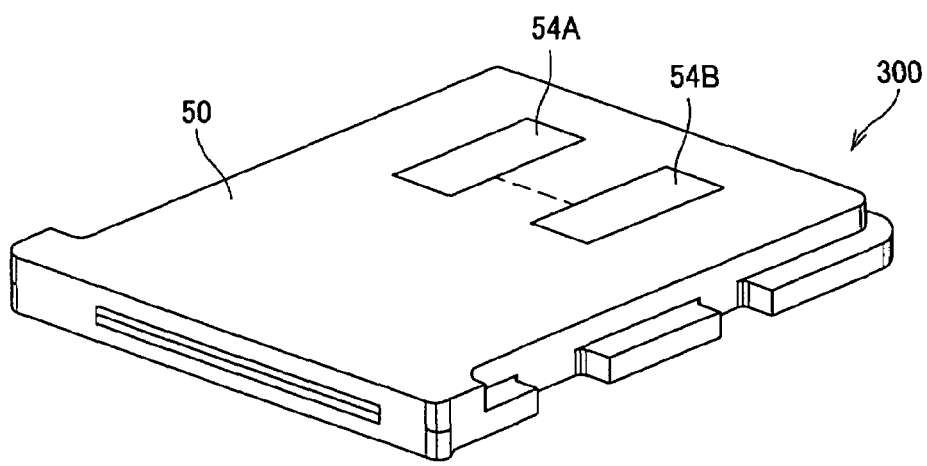

FIG. 13 is a schematic view of the memory-card-mounted body 400 illustrating the profiles of contact pieces 1 through 11 and 2' through 10' of first memory card 100 aligned with the memory-card-mounted body 400.

FIG. 14 is a chart illustrating the corresponding relationship between contact pieces 2' through 10' of first memory card 100 of FIG. 13 and contact pieces 42 through 49 of second memory card 200.

When the first memory card 100 is placed on the memory-card-mounted body 400 with the left and right edges thereof aligned with each other, the contact pieces 3' through 10' of the first memory card 100 and the contact pieces 42 through 49 of the second memory card 200 have longitudinally overlapping parts and transversally overlapping parts as viewed from above.

In other words, as shown in FIG. 14, signals DAT2, DAT3, CMD, VDD, CLK, VSS, DAT0 and DAT1 assigned respectively to the contact pieces 42 through 49 of the second memory card 200 correspond respectively to the contact pieces 3' through 10' of the first memory card 100.

In this embodiment, the profile of the first memory card 100 and the profile of the card tray 300 agree with each other when the first memory card 100 is placed on the card tray 300 with the left and right edges thereof aligned with each other and viewed from above.

More specifically, a recess 5214 is formed on the outer surface of the right wall 5208 at a rearward position.

A pair of recesses 5216 are formed on the outer surface of the left wall 5206 at longitudinal middle positions and separated from each other by a gap.

The recess 5214 of the right wall 5208 and the two recesses 5216 of the left wall 5206 are aligned respectively with the recess 2010 and the two recesses 2012 of the first memory card 100 when the first memory card 100 is placed on the card tray 300 with the left and right edges thereof aligned with each other and viewed from above. More specifically, the recess 5214 and the recesses 5216 of the card tray 300 respectively and exactly agree with the recess 2010 and the recesses 2012 of the first memory card 100 in terms of both profile and position.

Note that the front end of the outer surface of the left wall 5206 and the front end of the outer surface of the right wall 5208 are provided with respective curved surfaces 5218 so as to allow the second memory card 200 to be inserted into the card slot with ease.

Now, how to use the card tray 300 will be described below.

When the second memory card 200 is mounted to the card tray 300 to form the memory-card-mounted body 400, the second memory card 200 is inserted into the opening 5210 from the front edge 3002 thereof with the rear face of the second memory card 200 facing the recessed mount section 52 of the card tray 300 and the rear surface of the second memory card 200 is held in contact with the surface of the recessed mount section 52 of the card tray 300.

Under this condition, the engaging projection 3010 and the engaging recess 5210 are engaged with each other while the engaging recess 3012 and the engaging projection 5212 are engaged with each other.

When the second memory card 200 is taken out from the card tray 300, the second memory card 200 that is held in contact with the surface of the recessed mount section 52 of the card tray 300 is lifted at the rear edge thereof to disengage the engagement of the engaging projection 3010 and the engaging recess 5210 and also the engagement of the engaging recess 3012 and the engaging projection 5212. Then, the second memory card 200 is moved upward and frontward from the card tray 300 and pulled out through the opening 5210 from the front edge 3002 of the second memory card 200.

Now, an external apparatus to which a first memory card 100 or a memory-card-mounted body 400 is to be mounted will be described below.

The external apparatus includes a card slot for receiving a first memory card 100 or a memory-card-mounted body 400 and a control section for writing data in or reading data from the first memory card 100 or the memory-card-mounted body 400 mounted in the card slot.

The card slot has terminals to be respectively electrically connected to the contact pieces 1 through 11 and the contact pieces 2' through 10' of the first memory card 100 when the first memory card 100 is mounted in it.

Thus, as the memory-card-mounted body 400 is mounted in the card slot, the terminals that respectively correspond to the contact pieces 3' through 10' are electrically connected to the contact pieces 42 through 49 to make it possible to write data in and read data from the memory-card-mounted body 400, or the second memory card 200 to be more accurate.

With this embodiment, as the memory-card-mounted body 400 is inserted into the card slot adapted to receive a first memory card 100, the terminals of the card slot are directly electrically connected respectively to the corresponding contact pieces 42 through 49 of the second memory card 200.

Therefore, unlike card adaptors of above discussed type used in the past, the card tray 300 does not have to have first adaptor side contact pieces to be electrically connected to the contact pieces 42 through 49 of the second memory card 200, second adaptor side contact pieces to be electrically connected to the terminals of the card slot and conductor members for electrically connecting the first adaptor side contact pieces and the second adaptor side contact pieces so that it is possible to make the external dimensions of the card tray 300 agree with the external dimensions of downsized first memory card 100. Then, it is possible to mount the second memory card 200 in the card slot for receiving first memory card 100 by mounting the second memory card 200 to the card tray 300.

For the control section of an external apparatus to recognize first memory card 100 or second memory card 200 that is mounted in the card slot, it is sufficient to provide the main body 50 of the card tray 300 with a ground (VSS) contact piece 54A and an INS signal contact piece 54B that are electrically connected to each other on the rear surface thereof.

Then, the card slot is provided with a ground terminal (connected to the ground level of the external apparatus) to be connected to the ground (VSS) contact piece 54A and an INS terminal to be connected to the INS signal contact piece 54B when the card tray 300 is inserted into the card slot.

As the control section monitors the signal supplied to the INS terminal and detects if the signal level of the INS terminal is at the ground level or not, the control section can easily find out if the card tray 300 is inserted into the card slot or not.

For the control section of an external apparatus to recognize first memory card 100 or second memory card 200 that is mounted in the card slot, alternatively the main body 50 of the card tray 300 may be provided on the left wall 5206 or the right wall 5208 with an identification recess apart from the recesses 5214, 5216 that are already formed while the card slot may be provided with a detection switch for detecting the identification recess so that the control section may be able to find out if it is a first memory card 100 or a memory-card-mounted body 400 that is inserted into the card slot according to the operation of the detection switch. In short, the card tray 300 may be provided with an identification recess to be used for the purpose of identifying the memory-card-mounted body 400 carrying a second memory card 200.

With such an alternative arrangement, the control section of the external apparatus can find out with ease if the card tray 300 is inserted into the card slot or not by detecting and monitoring the operation of the detection switch.

Note that, while the profile of the first memory card 100 and the profile of the card tray 300 agree with each other when the first memory card 100 is placed on the card tray 300 with the left and right edges thereof aligned with each other and viewed from above in the above description of the embodiment, the main body 50 of the card tray 300 may alternatively be provided at a part thereof facing rearward with an anti-release mechanism for preventing the second memory card 200 from being freed from the recessed mount section 52 once it is mounted to and engaged with the recessed mount section 52.

With such an alternative arrangement, the anti-release mechanism will be projecting from the profile of the first memory card 100 when the first memory card 100 is placed on the card tray 300 with the left and right edges thereof aligned with each other and viewed from above. However, the anti-release mechanism will not obstruct at all the operation of mounting the memory-card-mounted body 400 in the card slot because it is located outside the card slot when the memory-card-mounted body 400 is mounted in the card slot.

Still alternatively, the second memory card 200 and the card tray 300 may be bonded to each other by means of a two-sided adhesive tape or like for the purpose of preventing the second memory card 200 from being released.

While the profile of the first memory card 100 and the profile of the card tray 300 agree with each other when the first memory card 100 is placed on the card tray 300 with the left and right edges thereof aligned with each other and viewed from above in the above description of the embodiment, the main body 50 of the card tray 300 may be provided at the front end of the left wall 5206 and at the front end of the right wall 5208 with a reinforcement wall that connects those front ends of the left wall 5206 and the right wall 5208.

With such an alternative arrangement, the reinforcement wall will be projecting from the profile of the first memory card 100 when the first memory card 100 is placed on the card tray 300 with the left and right edges thereof aligned with each other and viewed from above and the positions of the contact pieces 42 through 49 of the second memory card 200 are displaced rearward by the thickness of the reinforcement wall when the memory-card-mounted body 400 is mounted in the card slot. However, it is possible to secure the electric connections between the contact pieces 42 through 49 of the second memory card 200 and the corresponding respective terminals of the card slot because each of the contact pieces 42 through 49 of the second memory card 200 covers a certain longitudinal distance.

While the holder 30 of the second memory card 200 and the holder 20 of the first memory card 100 have a same length but the thickness and the width of the holder 30 are smaller than those of the holder 20 in the above description of the embodiment, a card tray according to the embodiment of the present invention is applicable to a situation where the length of the holder 30 of the second memory card 200 is smaller than the length of the holder 20 of the first memory card 100 without any problem.

In this embodiment, the ratio of the projection area of the holder 30 of the second memory card 200 that is the product of multiplication of the length and the width of the holder 30 of the second memory card 200 to the projection area of the holder 20 of the first memory card 100 that is the product of multiplication of the length and the width of the holder 20 of the first memory card 100 is no less than 70% and not more than 95% of the projection area of the card tray 300.

While the rear wall 5204 of the recessed mount section 52 of the card tray 300 comes to be aligned with the front edge of the second memory card 200 while the open part of the front edge of the recessed mount section 52 comes to be aligned with the rear edge of the second memory card 200 when the second memory card 200 is mounted to the recessed mount section 52 of the card tray 300 in the above description of the embodiment, the second memory card 200 may be mounted longitudinally oppositely to the recessed mount section 52.

Figure 16A:
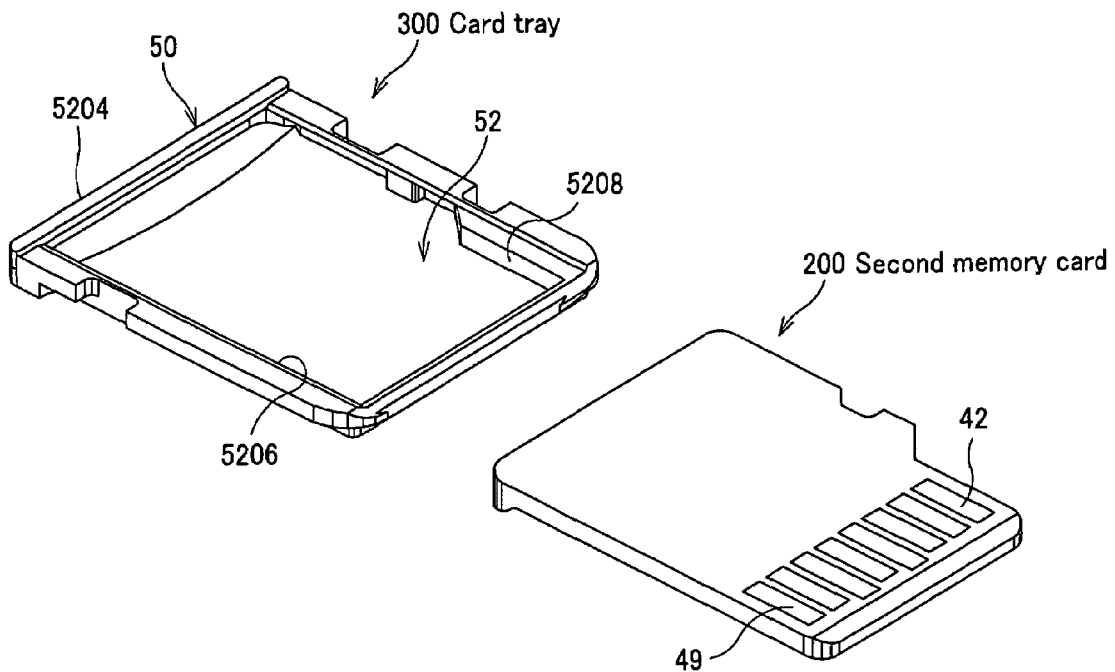
FIG. 16A and FIG. 16B are schematic perspective views of modified card tray 300 illustrating the direction in which the second memory card 200 is mounted to the modified card tray.
Figure 16B:
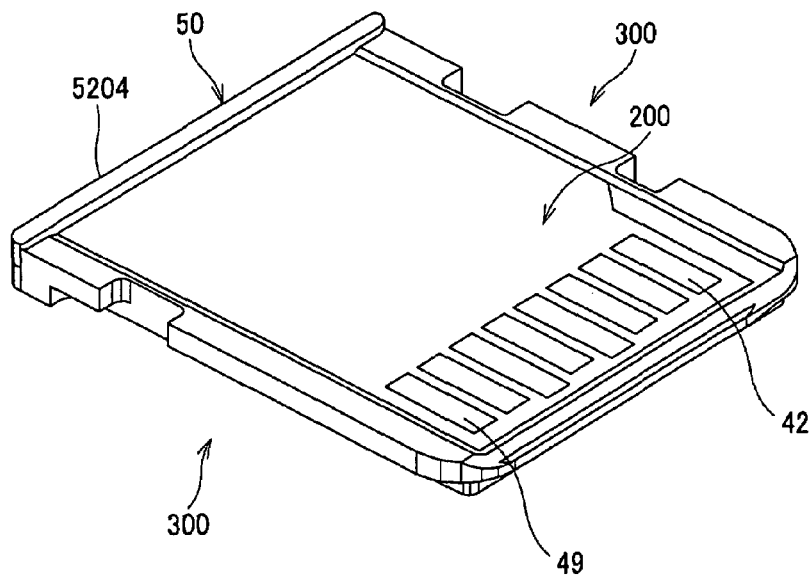

With such an arrangement as shown in FIGS. 16A and 16B, the rear edge of the second memory card 200 comes to be aligned with the rear wall 5204 of the recessed mount section 52 of the card tray 300 while the front edge of the second memory card 200 comes to be aligned with the open part of the front edge of the recessed mount section 52 when the second memory card 200 is mounted to the recessed mount section 52 of the card tray 300.

The advantages of the above-described embodiment remain unchanged with such an alternative arrangement.

While the first memory card 100 is a memory card prepared according to specifications substantially same as those of Memory Sticks in terms of interface but having downsized external dimensions if compared with a Memory Stick and the second memory card 200 is a TransFlash in the above description of the embodiment, the format of the first memory card 100 and that of the second memory card 200 are not limited to those listed above.

While the memory sections of the first and second memory cards 100, 200 are rewritable flash memories in the above description of the embodiment, the present invention is by no means limited thereto so long as data can be written in and/or read from the memory sections.

It should be understood by those skilled in the art that various modifications, combinations, sub-combinations and alterations may occur depending on design requirements and other factors insofar as they are within the scope of the appended claims or the equivalents thereof.

The invention claimed is:

1. A card tray and removable second memory card system, such that when the second memory card is mounted to the card tray, the combined card tray and second memory card is insertable in a same card slot as a first memory card, the system comprising:

the first memory card having a memory buried in a first rectangular plate-shaped section having length and width dimensions larger than a thickness dimension and a plurality of contact pieces arranged transversally in array at a first outer surface of the first rectangular plate-shaped section, the second memory card having a memory buried in a second rectangular plate-shaped section smaller than the first rectangular plate-shaped section of the first memory card and a plurality of contact pieces arranged transversally in array at a first outer surface of the second rectangular plate-shaped section at a substantially same pitch as that of the contact pieces of the first memory card;

and the card tray comprising:

a main body; and an open and recessed mount section formed as part of the main body to which the second memory card is mounted;

wherein a memory-card-mounted body is formed by securing the second memory card to the recessed mount section of the card tray with the first outer surface of the second memory card facing opposite to the recessed mount section and constituting a portion of an outer surface of the memory-card-mounted body, and wherein the thickness and the width of the memory-card-mounted body being substantially the same as the thickness and the width of the first memory card.

2. The card tray and removable second memory card system according to claim 1, wherein the first memory card and the memory-card-mounted body respectively have front edges, rear edges, left edges and right edges that are located in a rectangular shape and, when the first memory card is placed over the memory-card-mounted body with the front and rear edges thereof aligned with each other and the left and right edges thereof aligned with each other, the plurality of contact pieces of the first memory card and the plurality of contact pieces of the second memory card have longitudinally overlapping parts and transversally overlapping parts as viewed from above.

3. The card tray and removable second memory card system according to claim 1, wherein the main body of the card tray has a front edge and a rear edge arranged oppositely relative to each other and a left edge and a right edge arranged oppositely relative to each other to show a rectangular plate-shaped profile and the recessed mount section is defined by a rear wall, a left wall and a right wall extended respectively along the rear edge, the left edge and the right edge of the main body and also by the bottom wall, the recessed mount section being open along the front edge.

4. The card tray and removable second memory card system according to claim 1, wherein the main body of the card tray has a front edge and a rear edge arranged oppositely relative to each other and a left edge and a right edge arranged oppositely relative to each other to show a rectangular plate-shaped profile and the recessed mount section is defined by a rear wall, a left wall and a right wall extending respectively along the rear edge, the left edge and the right edge of the main body and also by the bottom wall, the recessed mount section being open along the front edge, and a transversally extending opening is formed through the rear wall.

5. The card tray and removable second memory card system according to claim 1, wherein the main body of the card tray has a front edge and a rear edge arranged oppositely relative to each other and a left edge and a right edge arranged oppositely relative to each other to show a rectangular plate-shaped profile and the recessed mount section is defined by a rear wall, a left wall and a right wall extending respectively along the rear edge, the left edge and the right edge of the main body and also by the bottom wall, the recessed mount section being open along the front edge, an transversally extending opening being formed through the rear wall on the bottom wall, an engaging section being formed at a position facing the bottom wall on either the left wall or the right wall, while the second rectangular plate-shaped section of the second memory card has a front edge and a rear edge arranged oppositely relative to each other and a left edge and a right edge arranged oppositely relative to each other, an engaging section being formed either at the left edge or the right edge so as to be able to be engaged with the engaging section of the card tray.

6. The card tray and removable second memory card system according to claim 1, wherein the main body of the card tray has a front edge and a rear edge arranged oppositely relative to each other and a left edge and a right edge arranged oppositely relative to each other to show a rectangular plate-shaped profile and the recessed mount section is defined by a rear wall, a left wall and a right wall extending respectively along the rear edge, the left edge and the right edge of the main body and also by the bottom wall, the recessed mount section being open along the front edge, an identification recess being formed at least at the left wall or the right wall for identifying the memory-card-mounted body.

7. The card tray and removable second memory card system according to claim 1, wherein the card tray is formed in such a way that the profile of the first memory card and that of the card tray agree with each other when the first memory card is placed over the card tray and viewed in plan.

8. The card tray and removable second memory card system according to claim 1, wherein the second rectangular plate-shaped section of the second memory card is so formed as to show a length smaller than the length of the first rectangular plate-shaped section of the first memory card.

9. The card tray and removable second memory card system according to claim 1, wherein the ratio of the projection area of the second rectangular plate-shaped section of the second memory card to the projection area of the first rectangular plate-shaped section of the first memory card is no less than 70% and not more than 95%.

10. The card tray and removable second memory card system according to claim 1, wherein said second memory card is separate and distinct from said first memory card.

11. The card tray and removable second memory card system according to claim 1, wherein said card tray is separate and distinct from said first memory card.

12. The card tray and removable second memory card system according to claim 1, wherein said second memory card is separate and distinct from said first memory card and said card tray is separate and distinct from said first memory card.

13. The card tray and removable second memory card system according to claim 1, wherein said card tray does not contain any functional electrical contacts for interfacing with the contacts formed on the first outer surface of the second memory card's second rectangular plate-shaped section.

14. The card tray and removable second memory card system according to claim 1, wherein said card tray does not contain any functional electrical contacts for interfacing with a card slot in which the card tray is to be inserted.

15. The card tray and removable second memory card system according to claim 1, wherein said memory-card-mounted body interfaces with a card slot into which the memory-card-mounted body is to be inserted only via the plurality of contact pieces formed at the first outer surface of the second rectangular plate-shaped section of said second memory card.

16. A card tray to which a second memory card can be mounted, the second memory card having a memory buried in a second rectangular plate-shaped section smaller than a first rectangular plate-shaped section of a first memory card and having a plurality of contact pieces arranged transversally in array on a first surface of the second rectangular plate-shaped section, the card tray comprising:

a main body; and an open and recessed mount section as part of the main body to which the second memory card is mounted, the open and recessed portion containing no functional electrical contacts for interfacing with the contacts formed on the first surface of the second memory card's second rectangular plate-shaped section;

wherein, when the second memory card is mounted to the card tray, the combined card tray and second memory card is insertable in a same card slot as a first memory card, the first memory card having a memory buried in the first rectangular plate-shaped section having length and width dimensions larger than a thickness dimension and a plurality of contact pieces arranged transversally in array on a first surface of the first rectangular plate-shaped section, and wherein the contact pieces formed on the second memory card are formed at a substantially same pitch as that of the contact pieces of the first memory card.

17. The card tray as set forth in claim 16, wherein a memory-card-mounted body being formed by mounting the second memory card to the recessed mount section with the first surface directed opposite to the recessed mount section, and wherein the thickness and the width of the memory-card-mounted body being substantially the same as the thickness and the width of the first memory card.

18. The card tray as set forth in claim 16, wherein said card tray does not contain any functional electrical contacts for interfacing with a card slot in which the card tray is to be inserted.

19. The card tray as set forth in claim 16, wherein when the second memory card is mounted to the card tray, the combined card tray and second memory card interfaces with a card slot into which the combined card tray and second memory card is to be inserted only via the plurality of contact pieces formed at the first outer surface of the second rectangular plate-shaped section of said second memory card.

* * * * *